US006245009B1

(12) United States Patent
Travis et al.

(10) Patent No.: US 6,245,009 B1
(45) Date of Patent: Jun. 12, 2001

(54) OPERATIONAL READINESS AND LIFE SUPPORT SYSTEMS

(75) Inventors: Thomas W. Travis, Fairfax Station, VA (US); Thomas R. Morgan, San Antonio, TX (US); Richard White, Converse, TX (US); Yasu Tai Chen, San Antonio, TX (US); Robert S. Hoskins, Robins AFB, GA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/371,664

(22) Filed: Aug. 10, 1999

(51) Int. Cl.[7] .................................................. A62B 17/00
(52) U.S. Cl. ............................................................ 600/20
(58) Field of Search .................. 600/19, 20; 128/202.12, 128/202.11, 205.25, 206.12, 206.21, 206.22, 206.23, 206.24, 206.26, 206.28, 207.12

(56) References Cited

U.S. PATENT DOCUMENTS

| H823 | * | 10/1990 | Conkle et al. ............................ 2/410 |
| 4,352,353 | * | 10/1982 | Bolton et al. .................... 128/201.24 |
| 4,404,969 | * | 9/1983 | Cresswell et al. .............. 128/201.23 |
| 4,651,728 | * | 3/1987 | Gupta et al. ................ 128/205.25 X |
| 4,799,476 | * | 1/1989 | McGrady .......................... 128/202.11 |
| 4,925,133 | * | 5/1990 | Wurst et al. ............................ 600/20 |
| 5,127,896 | * | 7/1992 | De Gaston .............................. 600/20 |
| 5,245,993 | * | 9/1993 | McGrady et al. .......... 128/206.23 X |
| 5,263,477 | * | 11/1993 | Crome .............................. 128/205.24 |
| 5,309,901 | * | 5/1994 | Beaussant ........................ 128/202.12 |
| 5,318,018 | * | 6/1994 | Puma et al. ..................... 128/202.11 |
| 5,477,850 | * | 12/1995 | Zegler et al. .................... 128/202.11 |

* cited by examiner

Primary Examiner—John P. Lacyk
Assistant Examiner—Joseph A. Cadugan
(74) Attorney, Agent, or Firm—Tony Y. Cole; Bobby D. Scearce; Thomas L. Kundert

(57) ABSTRACT

A wearable life support system integrates an antigravity compensation apparatus for providing counter-pressures on the human body in response to antigravity conditions with an environmental defense apparatus for providing operational conditions to a human within the life support system. A filtration apparatus removes harmful conditions from breathable gas provided to a human within the system. A temperature control apparatus maintains operational conditions to a human within system. A vision maintenance and protection apparatus is kept clear through use of a demisting apparatus that prevents visual distortion of a visor covering the human visual field. The Demisting apparatus is integratable with a wearable life support system that provides environmental defense and/or antigravity compensation to the human user. A portable environmental apparatus provides ground and back-up life sustaining conditions to a human within wearable life support systems.

18 Claims, 8 Drawing Sheets

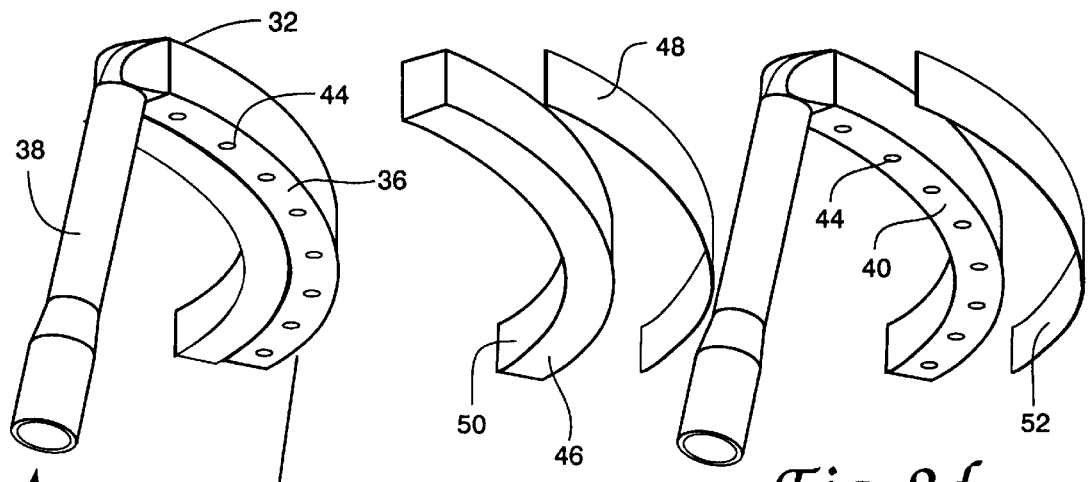
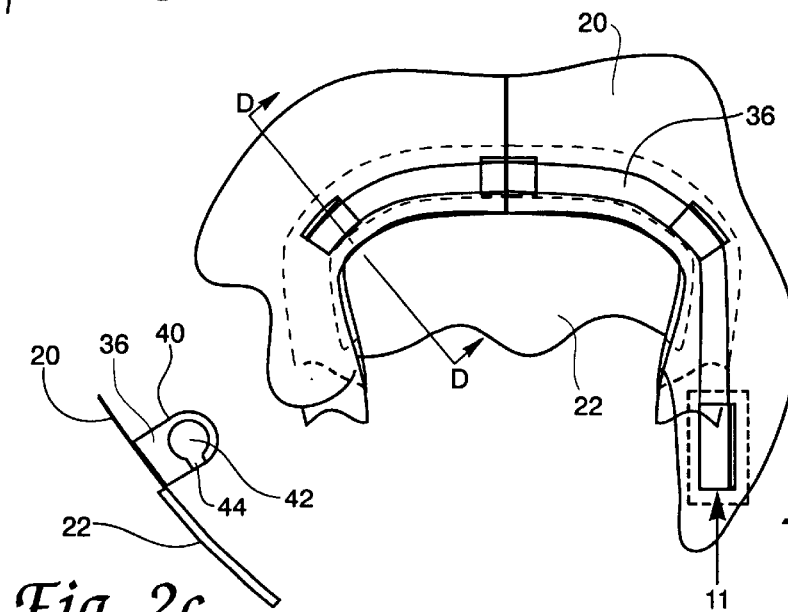
Fig. 2a
Fig. 2d
Fig. 2c
Fig. 2b
Fig. 2

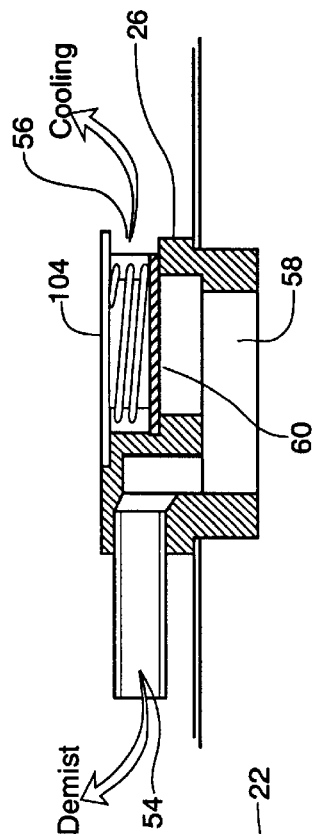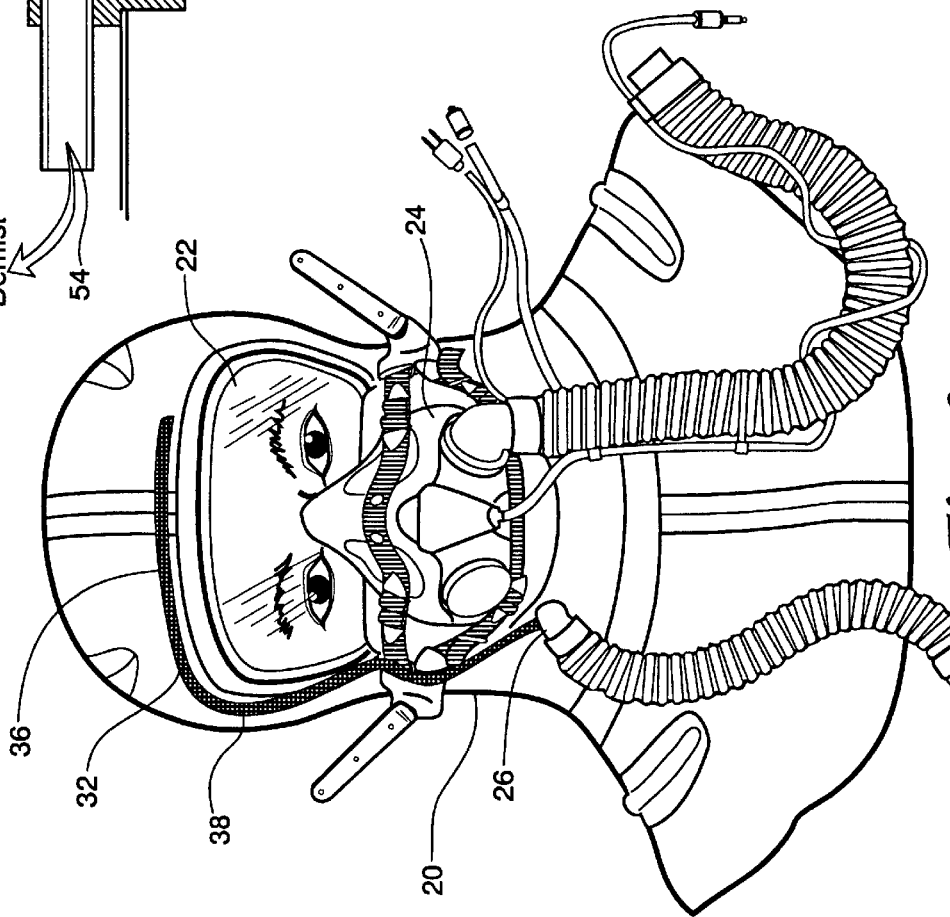

OPERATIONAL READINESS AND LIFE SUPPORT SYSTEMS

RIGHTS OF THE GOVERNMENT

The invention described herein may be manufactured and used by or for the Government of the United States for all governmental purposes without the payment of any royalty.

FIELD OF THE INVENTION

The present invention relates generally to life support systems. In particular, this invention relates to operational readiness and life supporting systems which provide, for example, high performance fighter aircraft aircrew with high antigravity (rapid acceleration/deceleration) protection, environmental (chemical/biological) defense protection (both in the aircraft and on the ground), head and body cooling, and/or visual system demisting.

BACKGROUND OF THE INVENTION

The life support systems currently used by US Air Force fighter aircrew are a combination of apparatuses that include an anti-gravity suit (which provides counterpressure to the aircrew's lower body thus preventing pooling of blood in the lower body, one of the adverse effects of sustained acceleration), a counterpressure vest (which inflates to apply pressure to the aircrew's chest and back thus helping the heart pump blood up to the eyes and brain, inhibiting downward blood flow), a high pressure oxygen mask (which delivers breathing gas to the aircrew) and a helmet with a bladder (which inflates to tighten the mask straps to keep the aircrew's oxygen mask in position and ensure a good seal). To reduce the thermal burden on the aircrew resulting from all of these components, the aircrew may also wear a cooling vest.

A breathing gas terminal block worn on the aircrew's combat flight uniform acts as a connector between manside components and aircraft equipment.

Aircraft equipment typically includes an anti-gravity valve and breathing regulator. When the anti-gravity valve senses increasing pressure beyond the operational threshold level, it pressurizes the aircrew's anti-gravity suit and sends a signal to the breathing regulator, which increases the pressure of the oxygen-enriched breathing gas distributed by the terminal block to the oxygen mask, helmet bladder and counterpressure vest. The breathing regulator receives oxygen-enriched breathing gas from a main breathing gas supply on the aircraft, such as an on board oxygen generating system (OBOGS). Also included with aircraft equipment is an aircraft mounted filter/blower which directs gas to the cooling vest.

Although this life support system provides fighter aircraft aircrew with high gravity protection (known in the art as PBG, or pressure breathing for acceleration protection), and some thermal relief, it provides no environmental defense protection. It would therefore be desirable to integrate environmental (biological/chemical) defense protection with pressure breathing capability and body cooling into a single life support system.

Chemical defense protection for aircrew is typically provided by an impermeable butyl rubber hood to which a visor and oxygen mask are integrally attached. The impermeable hood assembly is worn under the aircrew's helmet. The hood assembly provides chemical defense protection for the aircrew both in the air and on the ground (that is, when the aircrew is going to and from the aircraft). Although the hood assembly provides the aircrew with protection from chemical contaminants, its use can result in problems relating to sweat buildup under the hood, which is uncomfortable for the aircrew, and misting of the hood visor, which diminishes the aircrew's vision. Such demisting/fogging problems are common in most substantially closed environments incorporating visual systems and/or eye protection (e.g., visors, goggles, glasses, etc.). In addition, as previously indicated, chemical and biological defense protection is not currently integrated with pressure breathing capability into one fighter aircraft aircrew life support system.

It would therefore also be desirable to provide demisting capabilities for visual apparatuses, and to provide such capabilities for incorporation into environmental defense and/or antigravity life support systems.

It is therefore a feature of the present invention to provide a life support system which provides chemical defense and high gravity protection for the aircrew of a high performance fighter aircraft. A further feature of the present invention is to incorporate in an aircrew acceleration life support system a chemical defense hood assembly which provides chemical defense protection for the aircrew in the air and on the ground. A further object of the present invention is to provide a life support system which includes the capability to demist the aircrew's visor and cool the aircrew's head and body.

It is an advantage of the present invention that it is usable with the main source of breathing gas on the aircraft (such as an on board oxygen generation system or OBOGS), an aircraft-mounted filter/blower, and a portable filter/blower. A further advantage of the present invention is that it enables the aircrew to obtain demist gas from the OBOGS in the event of filter/blower failure. A further advantage of the present invention is that it enables the aircrew to manually control the source of demist gas.

Other aspects and advantages of the invention are set forth in part herein and in part will be obvious herefrom, or may be attained by means of instrumentalities and combinations pointed out in the appended claims.

SUMMARY OF THE INVENTION

In accordance with the foregoing principles and objects of the invention, a wearable life support system for maintaining the operational readiness of a human user of the wearable life support system is described Although reference is made to "aircrew" and "high performance aircraft" throughout the disclosure, it should be appreciated that the teachings of the preferred embodiments are not limited to use exclusively by aircrew.

In a first embodiment of the invention, a wearable life support system, useful for aircrew of high performance aircraft, integrates an antigravity compensation apparatus for providing counter-pressures on the human body in response to antigravity conditions with an environmental defense apparatus for providing operational conditions to a human within the life support system.

In another embodiment of the invention, a filtration apparatus removes harmful conditions e.g., chemical and/or biological contaminants from breathable gas provided to a human within the system.

Another embodiment of the invention provides a temperature control apparatus for maintaining operational conditions to a human within the system.

In yet another embodiment of the invention, an apparatus for ensuring that a clear field of vision for a human is maintained in any vision protective/maintenance gear (e.g., a visor) is disclosed wherein a visor is kept clear through use of a demisting apparatus that prevents visual distortion of a visor covering the human visual field.

Another embodiment of the invention integrates the apparatus for ensuring clear vision by demisting into a wearable environmental defense/sustaining system.

In another embodiment of the invention, a portable environmental apparatus provides ground and back-up life sustaining conditions to a human within the wearable life support system.

Another embodiment of the invention provides a portable apparatus for providing demisting gas to the demisting apparatus.

Another embodiment of the invention allows for the manual control of gases within the system.

BRIEF DESCRIPTION OF THE DRAWINGS

The invention will be clearly understood from the following detailed description of preferred embodiments thereof read in conjunction with the accompanying drawing wherein

FIG. 2a is a three-dimensional view of a diffuser portion of a demisting apparatus.

FIG. 2b is a view inside an environmental defense hood of the life support system incorporating componentry of a demisting apparatus.

FIG. 2c is a cross-sectional view along line D—D through the diffuser component of the demisting apparatus of FIG. 2b.

FIG. 2d is an exploded view of the diffuser portion of FIG. 2a.

FIG. 3 is a front view of an aircrew wearing the chemical defense hood and showing the diffuser which is located under a protective hood.

FIG. 4 is a cross-sectional view through a demist/cooling valve of the life support system of the invention.

DETAILED DESCRIPTION OF THE PREFERRED EMBODIMENTS

Figure 1:
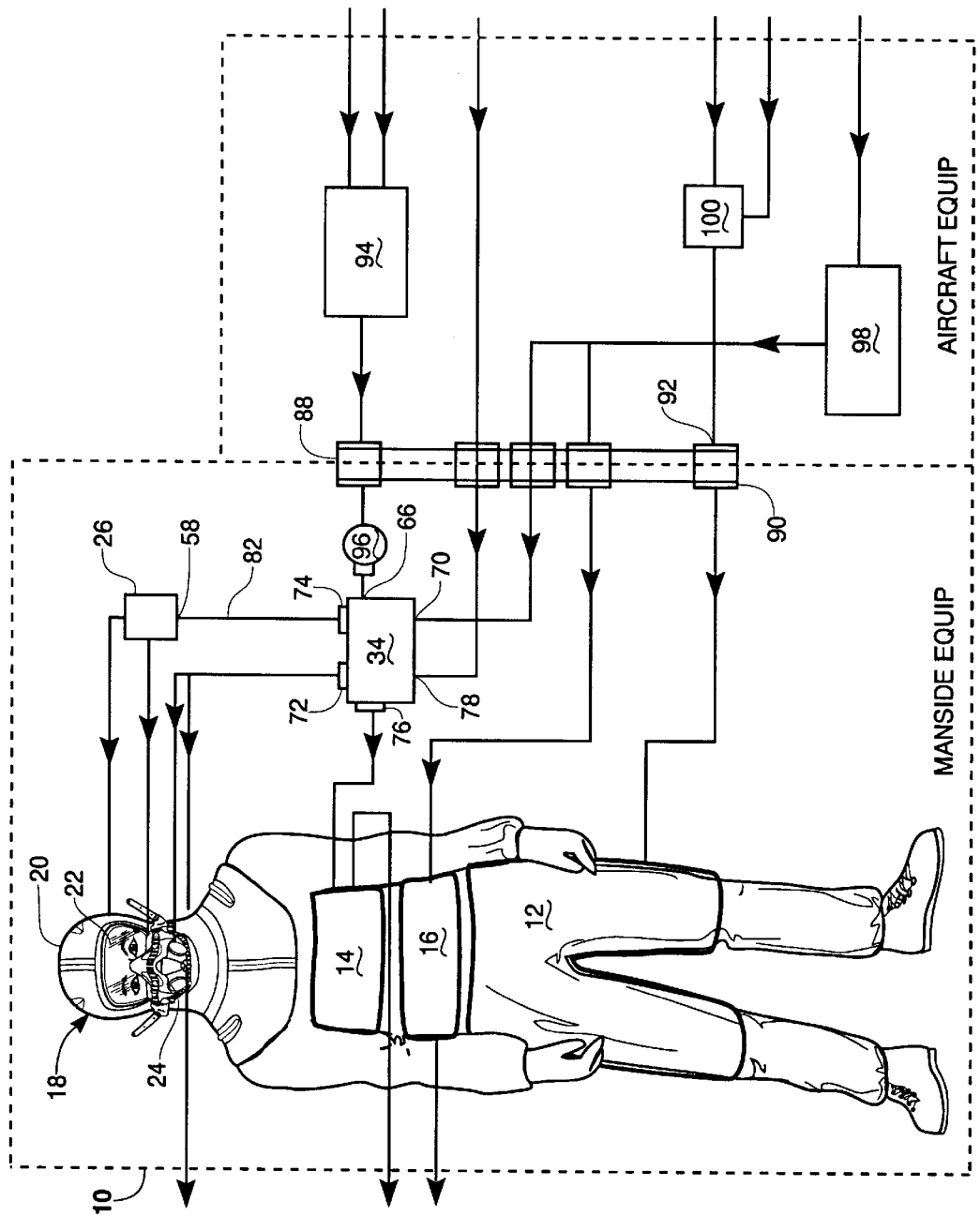
FIG. 1 is a schematic diagram of a representative integrated antigravity/environmental defense life support system and associated aircraft-based equipment.
Figure 1A:
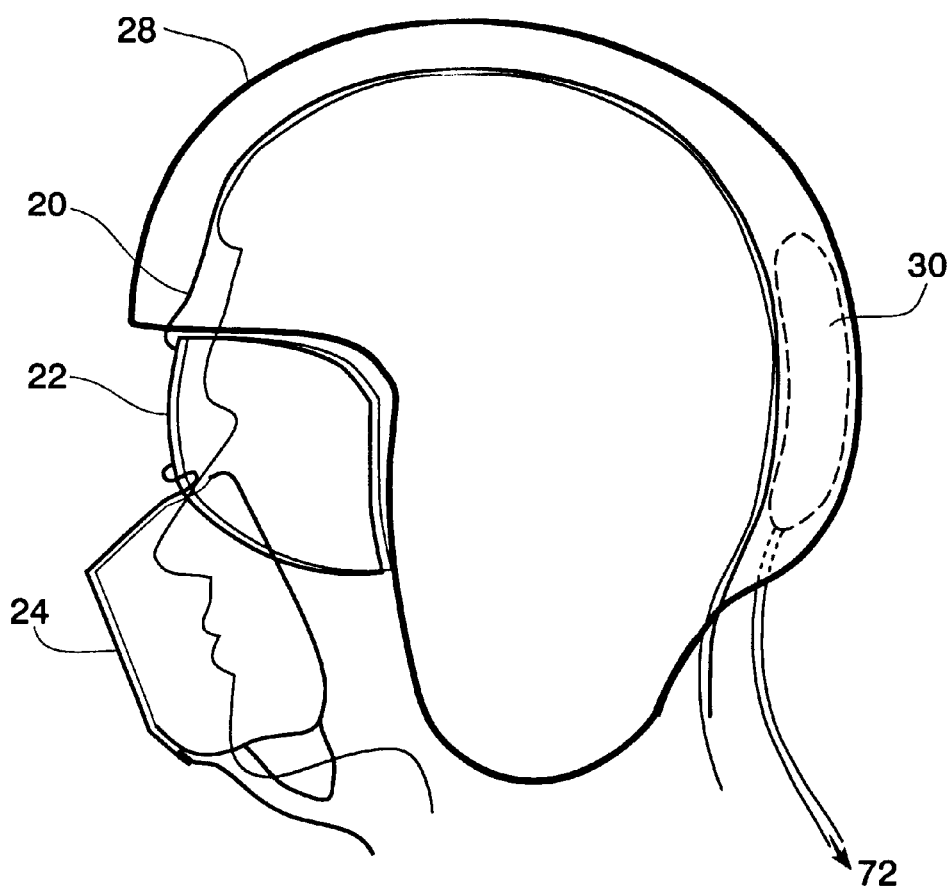
FIG. 1a is a side view of an environmental defense assembly of the invention.

Referring to FIG. 1, there is shown a schematic diagram of an integrated antigravity compensation/environmental defense life support system generally designated by the reference numeral 10. The illustrated life support system 10 is of the type that would be used by aircrew and consists of manside components which connect to aircraft and ground support equipment Manside components are worn by the aircrew and include an anti-gravity suit 12, counter-pressure vest 14, and cooling vest 16. Aircrew may wear an environmental (chemical/biological) sustaining/maintenance and/or defense assembly 18 consisting of a hood 20 to which a visor 22 and high pressure oxygen mask 24 are integrally attached. A newly formulated demisting apparatus comprising a demist/cooling valve 26 is integratable into the environmental defense assembly 18 at hood 20. As illustrated in FIG. 1a, a helmet 28 integrated with a pressure bladder 30 is wearable over hood 20. As shown in FIG. 3, a newly formulated removable diffuser 32 is mounted inside hood 20. As will be more fully explained, diffuser 32 directs gas across the interior of visor 22 for demisting purposes. Also newly formulated is an integrated terminal block 34, illustrated in FIG. 1, which is worn on the aircrew's combat uniform. As will be more fully explained, terminal block 34 distributes breathing gas to mask 24, counter-pressure vest 14 and helmet bladder 30, and distributes demist/cooling gas to valve 26. As will be further explained, valve 26 directs gas flow for visor 22 demist and head cooling.

With respect to the following detailed description with respect to demist capabilities of the diffuser 32 illustrated in FIG. 2a and demist-related componentry, general reference is made to aspects of the chemical defense assembly 18 (e.g., hood 20). Integration with hood 20 should not be interpreted as a requirement/limitation with respect to demisting capabilities taught herein. Demisting capabilities can be provided by the integration of the diffuser 32 and its related demisting components (browbar 36, tubing 38, etc.) with visual systems (e.g., visors, goggles, glasses, etc.) without integration with protective gear (e.g., helmets, protective suits, or the like). Reference will be made to a "visor" or "visual system" herein and throughout the claims, and should be broadly interpreted to extend to visors, goggles, glasses, face shields, and other human-worn vision protective/prosthetic gear. Demisting gas may be provided by a portable apparatus.

Diffuser 32 and valve 26 will now be described. As shown in FIG. 2a, diffuser 32 consists of a browbar 36 connecting to a hose assembly, or tubing, 38. Browbar 36 is molded into a headband shape to follow the contours of the aircrew's forehead. As shown in FIG. 2b, browbar 36 is positioned inside hood 20 above visor 22 such that its outer surface engages the interior surface of hood 20 and its inner surface engages the aircrew's forehead. As illustrated in FIG. 2c, browbar 36 includes a molded neoprene rubber member 40 which is substantially rectangular in cross section. An axial passage 42 approximately 0.25 inches in diameter extends through member 40. A plurality of passages 44 substantially perpendicular to axial passage 42 extend from the bottom of axial passage 42 through the underside of member 40. Preferably, there are eight passages 44, each 0.1 inch in diameter, equally spaced along the circumference of member 40, as shown in FIG. 2d. A foam member 46 is attached to the inner radius surface of member 40 using Velcro™ hooks 48 (or the like). A piece of cloth 50 is attached to the forehead-engaging surface of foam member 46. Cloth-covered foam member 46 may thus be easily removed from member 40 for cleaning or replacement.

Preferably, cloth 50 is composed of a hydrophilic fabric, such as Ortho-Wick™ manufactured by Guilford Mill, Inc., which acts to wick moisture away from the aircrew's forehead. Preferably, foam member 46 is composed of a high density, breathable urethane available in thickness of ⅛ inch, ¼ inch, ⅜ inch and ½ inch. This enables the aircrew user to select foam member 46 with an appropriate thickness to provide a desired standoff between the aircrew's forehead and hood 20. This is particularly helpful when the aircrew wears spectacles.

The outer radius surface of browbar member 40 is attached to hood 20 using fastening tape 52 which is also preferably made of Velcro™. Browbar 36 may thus be easily repositioned or removed from hood 20 for maintenance or cleaning.

As shown in FIG. 2a, hose assembly (tubing) 38 is positioned at one end of browbar 36 substantially perpendicular thereto. Hose assembly 38 is adhesively bonded to the interior surface of hood 20, along the side of visor 22. One end of hose assembly 38 is coupled to browbar 36. An opposing end connects to a spring-operated poppet valve 26 which is integrated into hood 20, as shown in FIG. 3. As illustrated in FIG. 4, valve 26 includes a demist outlet 54, to which hose assembly 38 is coupled, a head cooling outlet 56, and an inlet 58 which connects to a source of demist/cooling gas, as will be more fully explained. A spring-loaded poppet 60 operates to close valve 26. When valve 26 is open, demist/cooling gas entering inlet 58 is split between head cooling outlet 56 (providing cooling gas to the aircrew's head) and demist outlet 54 (where it flows through hose assembly 38 and into axial passage 42 of browbar 36 and is directed through perpendicular passages 44 across visor 22 to demist visor 22). When valve 26 is closed, all gas is diverted to demist outlet 54. Sufficient demist/cooling gas pressure is required to open valve 26. When pressure drops, poppet 60 closes valve 26 and shuts off head cooling flow, as will be further explained.

Figure 5:
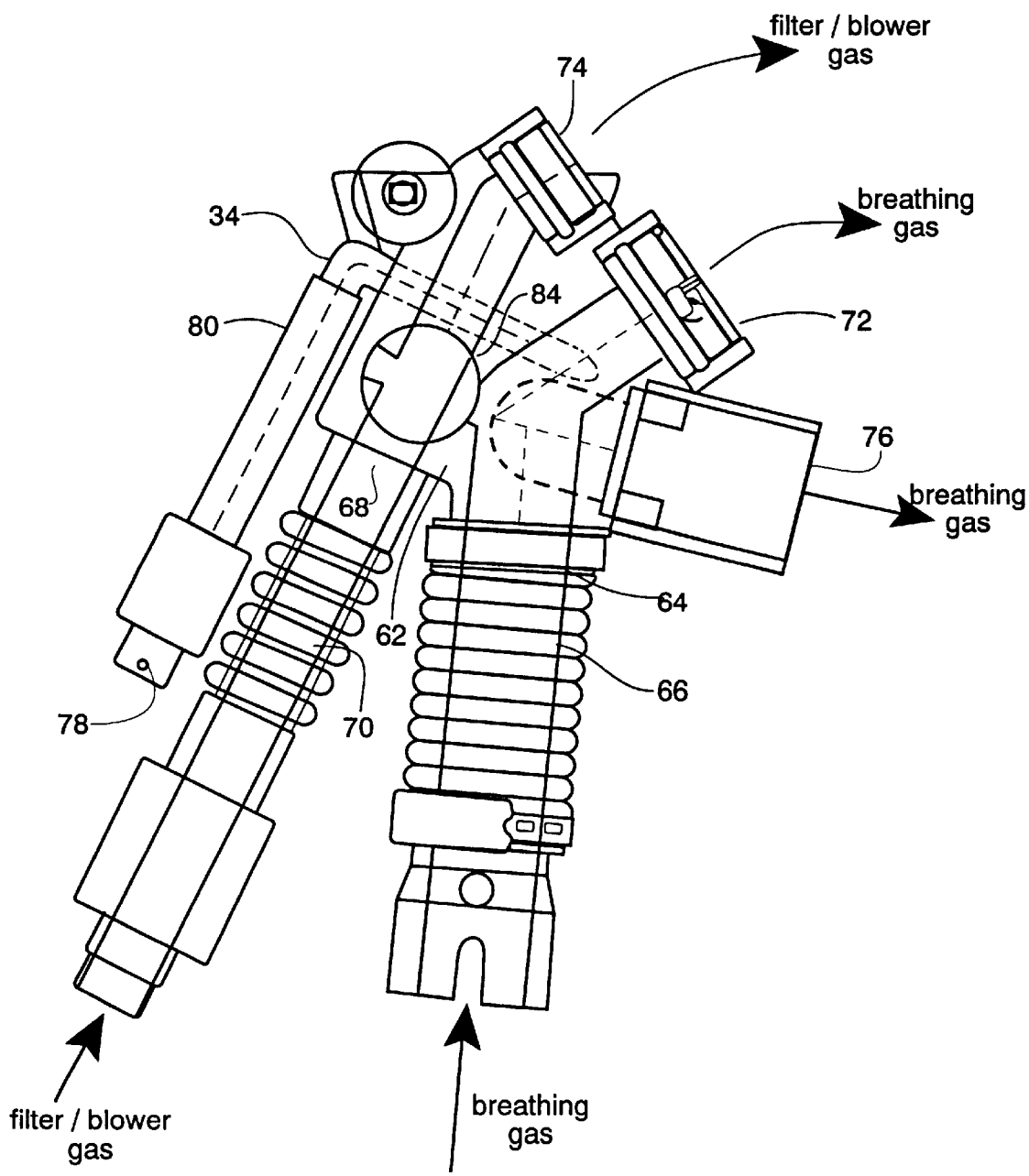
FIG. 5 is a side view of an integrated terminal block of the life support system of the invention showing a manually adjustable switch of the terminal block in a first position.

Terminal block 34 will now be described. As shown in FIG. 5, terminal block 34 includes a central manifold chamber 62 having a main breathing gas inlet port 64 which is coupled to an inlet hose 66, a filter/blower gas inlet port 68 which is coupled to an inlet hose 70, a breathing gas outlet port 72, a demist outlet port 74, and a vest outlet port 76. An emergency breathing gas inlet port 78 is connected via a channel 80 to breathing gas outlet port 72.

As illustrated in FIG. 1, breathing gas outlet port 72 connects to the aircrew's breathing mask 24. As shown in FIG. 1a, breathing gas outlet port 72 also connects to helmet bladder 30. As further illustrated in FIG. 1, vest outlet port 76 connects to the aircrew's counter-pressure vest 14, all in a manner well known in the art. Demist outlet port 74 connects via a demist/cooling hose 82 to valve inlet 58. Breathing gas and filter/blower gas inlets 66, 78 and 70 connect to supplies of these gases, as will be more fully explained in the discussion of aircraft and ground support equipment.

As shown in FIG. 5, a manually adjustable switch, or valving mechanism, 84 is mounted in central manifold chamber 62 of terminal block 34. Switch 84 is moveable between a first position illustrated in FIG. 5 and a second position illustrated in FIGS. 6a and 6b.

When switch 84 is in the first position as shown in FIG. 5, breathing gas entering breathing inlet 66 flows through central manifold 62 and out of breathing outlet 72 and vest outlet 76, as indicated by the arrows. Filter/blower gas entering filter/blower inlet 70 flows out of demist outlet 74, as shown.

Figure 6A:
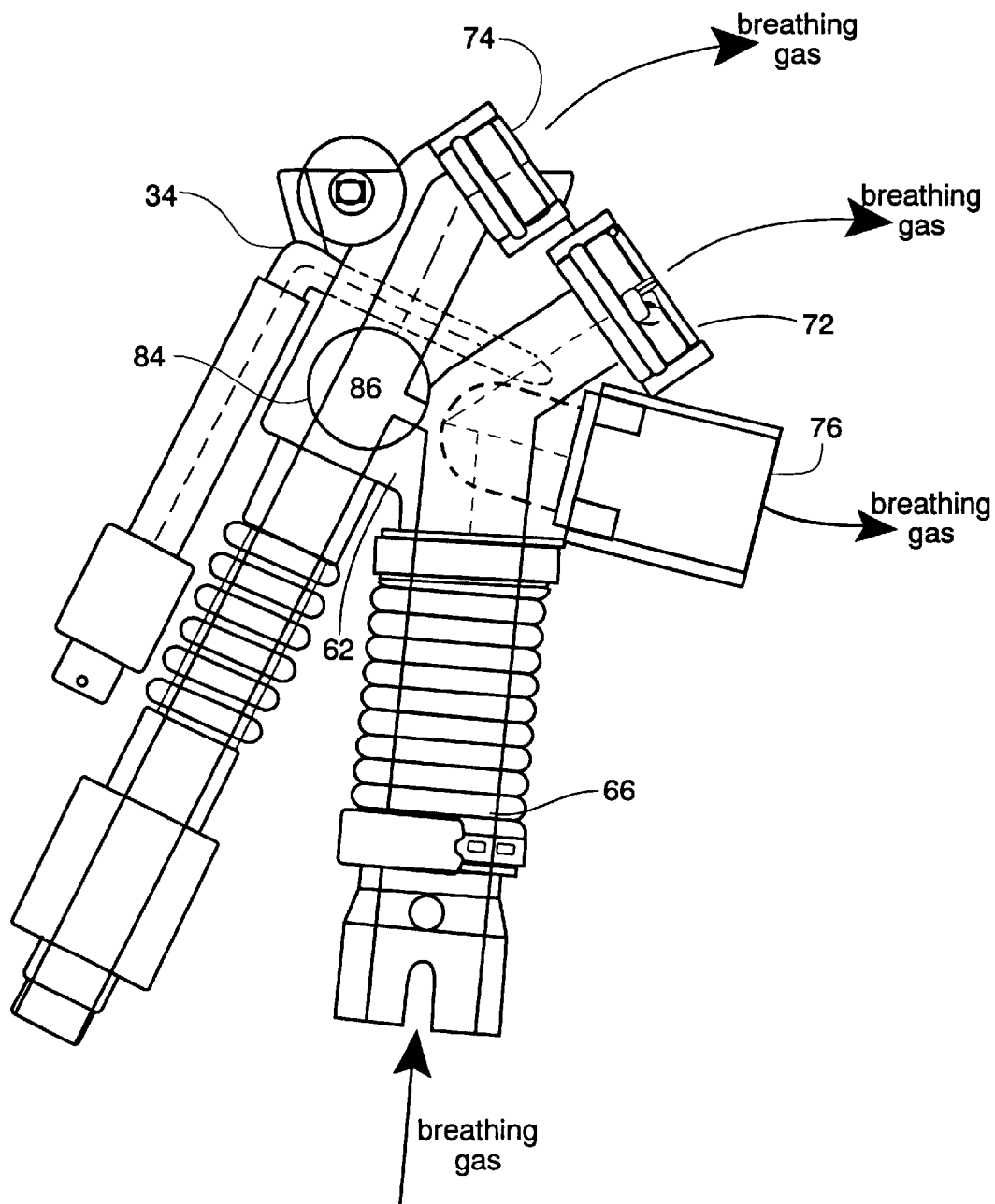
FIG. 6a is a side view of the integrated terminal block showing the manually adjustable switch in a second position and showing the flow of breathing gas through the terminal block.
Figure 6B:
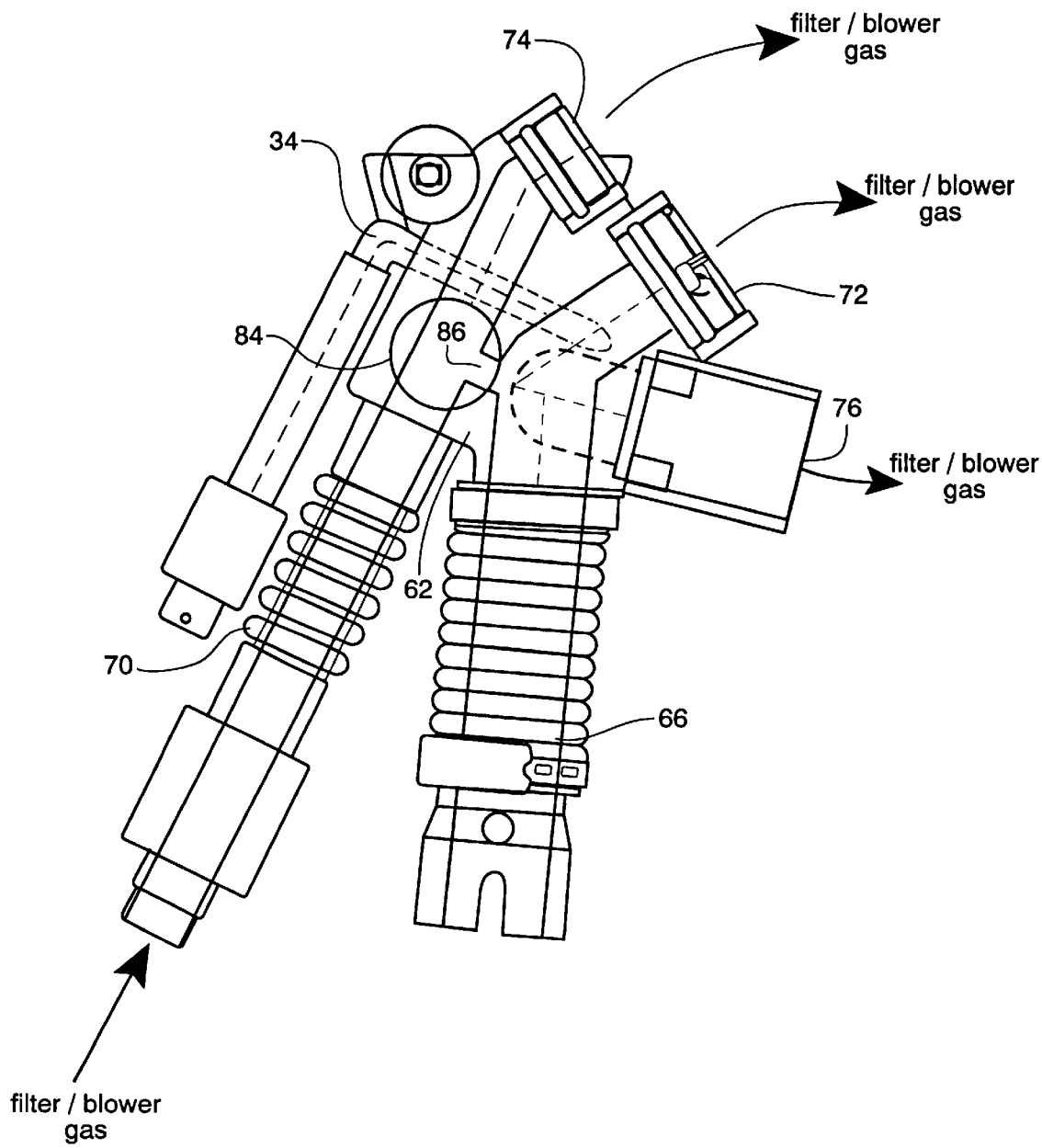
FIG. 6b is a side view of the integrated terminal block showing the manually adjustable switch in a second position and showing the flow of filter/blower gas through the terminal block.

When switch 84 is in the second position as shown in FIG. 6a, breathing gas entering breathing inlet 66 flows through central manifold 62 and out of breathing outlet 72, vest outlet 76 and demist outlet 74, as indicated by the arrows. Similarly, as shown in FIG. 6b, filter/blower gas entering demist inlet 70 flows out of demist outlet 74, breathing outlet 72 and vest outlet 76. Thus, as illustrated in FIGS. 6a, 6b, in the second position, switch 84 opens a passage 86 for breathing gas to flow to demist outlet 74 and for filter/blower gas to flow to breathing and vest and bladder outlets 72 and 76.

Aircraft equipment connecting to the combined acceleration/chemical defense aircrew life support system will now be described. As illustrated in FIG. 1, in the aircraft, breathing gas and demist/cooling gas inlets are connected to supplies of these gases via a personal equipment connector 88, which carries all manside/aircraft communication lines, including cooling vest and antigravity suit supplies and intercommunication leads. Personnel equipment connector 88 includes a manside portion 90 and aircraft portion 92 and is mountable on the aircraft seat (not shown). As shown in FIG. 1, main breathing gas inlet 66 is coupled by a series of hoses to a breathing regulator 94 which receives high pressure breathing gas from the main breathing gas supply (not shown). The main breathing gas supply may be an on board oxygen generating system (OBOGS). This breathing gas is filtered by filtering apparatus 96 prior to entering breathing gas inlet 66. Filter/blower gas inlet 70 is coupled by a series of hoses to an aircraft-mounted filter/blower unit 98 which receives air from the aircraft cabin. Cooling vest 16 also connects via a series of hoses to filter/blower unit 98. Emergency breathing gas inlet 78 is coupled by a series of hoses to an emergency oxygen reservoir (not shown). Antigravity suit 12 connects via a series of hoses to antigravity valve 100. Each of these pieces of aircraft equipment (OBOGS, personnel equipment connector, breathing regulator, filter, aircraft-mounted filter/blower, emergency oxygen reservoir, and antigravity valve) are well known in the art.

Figure 7:
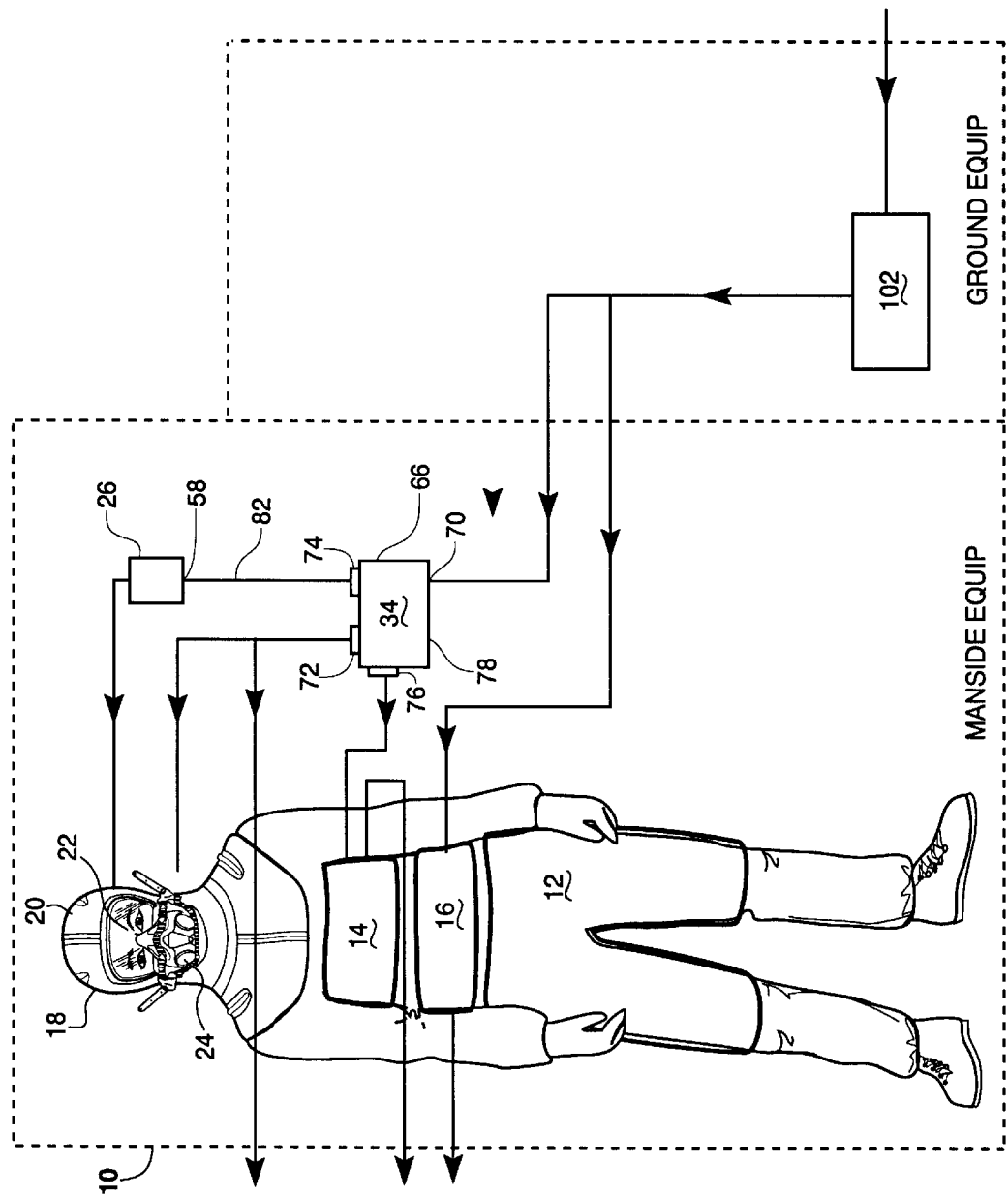
FIG. 7 is a schematic diagram of the life support system and associated ground support equipment.

Life support system ground equipment/portable environmental apparatus will now be described. As shown in FIG. 7, on the ground, a portable filter/blower 102 provides demist/cooling gas to the aircrew. Filter/blower inlet 70 is coupled by a series of hoses to portable filter/blower 102. Portable filter/blowers are well known in the art. It may be desirable to provide for a separate portable apparatus that can exclusively provide demisting/defogging gas to the demisting apparatus.

The combined acceleration/chemical defense aircrew life support system will now be described in the context of ground and aircraft operations in order to enable understanding of the invention.

During ground operation, the aircrew uses portable filter/blower 102 to provide demist/cooling gas to browbar 36 and cooling vest 16. As illustrated in FIG. 7, the aircrew connects inlet hose 70 and cooling vest 16 to filter/blower 102. The aircrew sets switch 84 to the second position, as illustrated in FIG. 6b, and turns filter/blower 102 on. As illustrated in FIG. 6b part of the filter/blower gas entering terminal block 34 will flow from dermist outlet port 74, where it will be directed to inlet 58 of demist/cooling valve 26. As illustrated in FIG. 4, valve 26 will split gas flow between visor demist and head cooling. Demist gas will flow through demist outlet 54, into diffuser 32 and be directed across the aircrew's visor 22, as shown in FIGS. 2a, 4. Head cooling gas will flow through head cooling outlet 56 and around the aircrew's hood 20, thereby providing cooling gas to the aircrew's head. Part of the filter/blower gas will also flow from breathing gas outlet port 72 to mask 24 and bladder 30, as shown in FIG. 1a.

When the aircrew enters the aircraft cockpit, he disconnects inlet hose 70 and cooling vest 16 from portable filter/blower 102 and reconnects inlet hose 70 and cooling vest 16 to aircraft mounted filter/blower 98, as illustrated in FIG. 1. In addition, the aircrew connects main breathing gas inlet port 66 to regulator 94 and emergency breathing gas inlet port 78 to a source of emergency breathing gas (not shown), such as an emergency oxygen bottle. As is known in the art, regulator 94 will provide breathing gas to mask 24 through filter 96. Also, as is known, the emergency oxygen bottle will supply breathing gas to mask 24 when the main source of breathing gas (such as OBOGS) either does not work or cannot supply breathing gas to mask 24. The aircrew also connects vest outlet 76 to counterpressure vest 14 and antigravity suit 12 to antigravity valve 100. As is known in the art, when the aircrew is exposed to high gravity, antigravity valve 100 will pressurize antigravity suit 12 and send a signal to breathing regulator 94, which will increase the pressure of breathing gas distributed to mask 24, bladder 30 and counterpressure vest 14

The aircrew sets switch 84 to the first position, as illustrated in FIG. 5. The breathing gas entering terminal block 34 will flow from breathing gas outlet port 72 and vest outlet 76 and be directed to mask 24 and counterpressure vest 14, as indicated previously. The filter/blower gas entering terminal block 34 will flow from demist outlet port 74 and be directed to inlet 58 of demist/cooling valve 26. As illustrated in FIG. 4, valve 26 will split gas flow between visor 22 demist and head cooling. Demist gas will flow into diffuser 32 and be directed across the aircrew's visor 22, as shown in FIG. 2a. Head cooling gas will flow into the aircrew's hood 20 through head cooling outlet 56, thereby providing cooling gas to the aircrew's head.

In the event of aircraft mounted filter/blower 98 failure, the aircrew sets switch 84 to the second position as illustrated in FIG. 6a. Part of the breathing gas entering breathing gas inlet 66 will flow from breathing gas outlet port 72 and be directed to mask 24 and counterpressure vest 14, as indicated previously. Part of the breathing gas entering breathing gas inlet 66 will flow from demist outlet port 74, and be directed to inlet 58 of demist/cooling valve 26, as illustrated in FIG. 4. It should be noted that, to maintain PBG performance, passage 86 is dimensioned to restrict the amount of flow diverted from breathing gas for demist to a fraction of the normal input pressure. It must also be noted that the amount of breathing gas allowed through passage 86 is therefore much lower than normally available for demist and head cooling. For this reason, all diverted breathing gas must be used for demist.

Spring loaded poppet 60 operates to shut off head cooling in the event of aircraft-mounted filter/blower 98 failure, as illustrated in FIG. 4. When blower 98 blower is operating, the demist/cooling gas pressure is sufficient to open valve 26, which operates to split gas flow between visor 22 demist and head cooling, as previously explained. However, when blower gas pressure is not present, spring 104 forces poppet 60 to close. This operates to divert all gas to diffuser 32, where it directed across the aircrew's visor 22, as shown in FIG. 2a and as previously explained.

It is understood that modifications to the invention may be made as might occur to one with skill in the field of the invention within the scope of the appended claims. All embodiments contemplated thereunder which achieve the objects of the invention have therefore not been shown in complete detail. Other embodiments may be developed without departing from the spirit of the invention or from the scope of the appended claims.

We claim:

1. A wearable life support system adapted for use with a human body and for maintaining life supporting conditions for the human body within said wearable life support system, said wearable life support system comprising:
    (a) an antigravity compensation apparatus for providing counterpressures to the human body in response to antigravity conditions;
    (b) an environmental defense apparatus for providing operational conditions to the human body, said environmental defense system further comprising a hood including an integrated visor and oxygen mask; and
    (c) a manually adjustable valving mechanism movable from: (i) a first position that allows a first gas entering a breathing inlet to flow through a manifold and out of a breathing outlet, vest outlet and demist outlet (ii) to a second position that allows breathing gas to enter said breathing inlet and to flow through said manifold out of said breathing outlet and said vest outlet, and a second gas entering said blower inlet to flow through said manifold to said demist outlet.

2. The system of claim 1, wherein said environmental defense apparatus further comprises a filtration apparatus for removing contaminants from breathable gas provided to said system.

3. The system of claim 2, wherein said environmental defense apparatus further comprises a temperature control apparatus for maintaining the human body at an operational condition.

4. The system of claim 3 further comprising a demisting apparatus adaptable to said visor.

5. The system of claim 2 further comprising a demisting apparatus adaptable to said visor.

6. The system of claim 1 further comprising a demisting apparatus adaptable to said visor.

7. The system of claim 1, wherein said environmental defense apparatus further comprises a temperature control apparatus for maintaining a human within said life support system at an operational condition.

8. The system of claim 7, wherein said environmental defense apparatus further comprises a filtration apparatus for removing contaminants from breathable gas provided within said system.

9. The system of claim 8 further comprising a demisting apparatus adaptable to said visor.

10. The system of claim 7 further comprising a demisting apparatus adaptable to said visor.

11. The system of claim 1 further comprising a portable environmental apparatus for providing ground and back-up life sustaining conditions to a human within said system.

12. A wearable life and operational readiness sustaining system adapted for use with a human body, comprising:
    (a) an antigravity compensation mechanism for providing counterpressures to a human body in response to gravitational forces;
    (b) an environmental defense apparatus for providing operational conditions to the human body, said environmental defense system further comprising:
        (i) a chemical hood further including an integrated visor and an integrated oxygen mask;
        (ii) a cooling vest;
        (iii) a head cooling apparatus; and
        (iv) a demisting apparatus adaptable to said visor for preventing visual distortion of a human by said visor; and
    (c) a manually adjustable valving mechanism movable from: (i) a first position that allow a first gas entering a breathing inlet to flow through a manifold and out of a breathing outlet to said oxygen mask, vest outlet to said cooling vest and demist outlet to said demist apparatus, (ii) to a second position that allows breathing gas entering said breathing inlet to flow through said manifold out of said breathing outlet and said vest outlet and said second gas entering said blower inlet to flow through said manifold out of said demist outlet to said demisting apparatus.

13. The system of claim 12, wherein said antigravity compensation mechanism further comprises:
(a) a counter-pressure vest; and
(b) a helmet integrated with a pressure bladder.

14. The system of claim 12, wherein said head cooling apparatus is integrated within a helmet.

15. The system of claim 14, wherein said head cooling apparatus further comprises integration of said chemical defense hood with said helmet.

16. The system of claim 12 further comprising a portable environmental apparatus for providing ground and back-up life sustaining conditions to said system.

17. An integrated antigravity and environmental compensation system comprising an impermeable suit and hood configuration wearable by aerospace personnel, said system further comprising:
(a) a counter-pressure apparatus within said suit for providing counterpressure at plural locations of aerospace personnel in response to forces of acceleration and deceleration, further comprising:
  (i) a counterpressure vest; and
  (ii) a helmet integrated with a pressure bladder; and
(b) an environmental apparatus for maintaining operational air and temperature conditions for aerospace personnel, said environmental defense system further comprising:
  (i) a hood further including an integrated visor and an integrated oxygen mask;
  (ii) a cooling vest;
  (iii) a head cooling apparatus; and
  (iv) a demisting apparatus adaptable to said visor for preventing visual distortion of aerospace personnel by said visor; and
(c) a manually adjustable valving mechanism movable from: (i) a first position that allows a first gas entering a breathing inlet to flow through a manifold and out of a breathing outlet to said oxygen mask and vest outlet to said vest and allows a second gas entering a blower inlet to flow out of a demist outlet to said demist apparatus, (ii) to a second position that allows breathing gas entering said blower inlet to flow through said manifold out of said breathing outlet, said vest outlet and said demist outlet.

18. The system of claim 17 further comprising a portable environmental apparatus for providing said breathing gas for ground and back-up life sustaining conditions.

* * * * *